United States Patent
Kwon et al.

(10) Patent No.: US 9,944,813 B2
(45) Date of Patent: Apr. 17, 2018

(54) METAL NANOPLATE, A METHOD FOR PREPARING THE SAME, A CONDUCTIVE INK COMPOSITION, AND A CONDUCTIVE FILM COMPRISING THE SAME

(71) Applicant: LG Chem, Ltd., Seoul (KR)

(72) Inventors: Won Jong Kwon, Daejeon (KR); Se-Ho Park, Daejeon (KR); Sung-Ho Yoon, Daejeon (KR); Yeo-Jin Jeon, Daejeon (KR)

(73) Assignee: LG Chem, Ltd. (KR)

( * ) Notice: Subject to any disclaimer, the term of this patent is extended or adjusted under 35 U.S.C. 154(b) by 120 days.

(21) Appl. No.: 14/898,401

(22) PCT Filed: Jun. 12, 2014

(86) PCT No.: PCT/KR2014/005174
§ 371 (c)(1),
(2) Date: Dec. 14, 2015

(87) PCT Pub. No.: WO2014/200288
PCT Pub. Date: Dec. 18, 2014

(65) Prior Publication Data
US 2016/0137865 A1    May 19, 2016

(30) Foreign Application Priority Data
Jun. 14, 2013  (KR) .................. 10-2013-0068433

(51) Int. Cl.
| H01B 1/02 | (2006.01) |
| C09D 11/52 | (2014.01) |
| B22F 1/00 | (2006.01) |
| B22F 9/24 | (2006.01) |
| C09D 11/03 | (2014.01) |

(52) U.S. Cl.
CPC ............ *C09D 11/52* (2013.01); *B22F 1/0003* (2013.01); *B22F 1/0018* (2013.01); *B22F 1/0062* (2013.01); *B22F 9/24* (2013.01); *C09D 11/03* (2013.01); *B22F 1/0059* (2013.01); *B22F 2001/0033* (2013.01); *B22F 2009/245* (2013.01); *B22F 2301/255* (2013.01); *B22F 2304/056* (2013.01)

(58) Field of Classification Search
CPC ...... B22F 1/0003; B22F 1/0018; B22F 1/255; B22F 2304/056; H01B 1/02; H01B 1/22
USPC .......................... 252/502, 506, 510, 511, 514
See application file for complete search history.

(56) References Cited

U.S. PATENT DOCUMENTS

| 8,288,021 B2 | 10/2012 | Funakubo |
| 8,865,251 B2 | 10/2014 | Kwon et al. |
| 2008/0213592 A1 | 9/2008 | Goia et al. |
| 2009/0029167 A1* | 1/2009 | Sun .................. B82Y 30/00 428/402 |
| 2010/0002282 A1* | 1/2010 | Agrawal .............. G02F 1/155 359/275 |
| 2010/0051931 A1* | 3/2010 | Wada .................. B82Y 10/00 257/40 |
| 2011/0262702 A1 | 10/2011 | Kim et al. |
| 2012/0128996 A1 | 5/2012 | Kwon et al. |
| 2012/0138913 A1 | 6/2012 | Alsayed et al. |
| 2012/0251736 A1 | 10/2012 | Hong et al. |
| 2012/0329636 A1 | 12/2012 | Kwon et al. |
| 2012/0329640 A1 | 12/2012 | Bosnyak et al. |
| 2013/0059984 A1 | 3/2013 | Kwon et al. |

FOREIGN PATENT DOCUMENTS

| CN | 102781817 A | 11/2012 |
| JP | 2004161570 A | 6/2004 |
| KR | 100600938 B1 | 7/2006 |
| KR | 20100031475 A | 3/2010 |
| KR | 20110102834 A | 9/2011 |
| KR | 101085160 B1 | 11/2011 |
| KR | 101126086 B1 | 3/2012 |
| KR | 101139927 B1 | 4/2012 |
| KR | 20120110554 A | 10/2012 |
| WO | 2007065154 A2 | 6/2007 |

OTHER PUBLICATIONS

Internmational Search Report for Application No. PCT/KR2014/005174 dated Sep. 22, 2014.
Kim, Mun Ho, et al., Synthesis of silver nanoplates with controlled shapes by reducing silver nitrate with poly(vinyl pyrrolidone) in N-methylpyrrolidone, CrystEngComm, vol. 15, pp. 4660-4666, 2013.
Extended European Search Report for Application No. 14810483.9 dated Dec. 16, 2016.
P. R. Sajanlal et al: "Wires, Plates, Flowers, Needles, and Core-Shells: Diverse Nanostructures of Gold Using Polyaniline Templates", Langmuir, vol. 24, No. 9, May 1, 2008 (May 1, 2008), pp. 4607-4614, XP055127576.

* cited by examiner

*Primary Examiner* — Tri V Nguyen
(74) *Attorney, Agent, or Firm* — Lerner, David, Littenberg, Krumholz & Mentlik, LLP

(57) ABSTRACT

The present invention relates to a metal nanoplate, a method for manufacturing same, and a conductive ink composition and a conductive film comprising metal nanoplate. The metal nanoplate does not require application of a high temperature and high pressure and thus can be easily manufactured at a low temperature and at normal pressure, and a conductive film or a conductive pattern, among others, having excellent conductivity can be formed even when the conductive ink composition comprising the metal nanoplate is printed on a substrate and then heat-treated or dried at a low temperature. As a result, the metal nanoplate and the conductive ink composition comprising same can be very appropriately applied to various semiconductor elements, display devices, or when forming a conductive pattern or a conductive film for a solar cell in an environment requiring low-temperature firing.

20 Claims, 2 Drawing Sheets

METAL NANOPLATE, A METHOD FOR PREPARING THE SAME, A CONDUCTIVE INK COMPOSITION, AND A CONDUCTIVE FILM COMPRISING THE SAME

CROSS-REFERENCE TO RELATED APPLICATION

This application is a national phase entry under 35 U.S.C. § 371 of International Application No. PCT/KR2014/005174, filed on Jun. 12, 2014, which claims priority to Korean Patent Application No. 10-2013-0068433, filed on Jun. 14, 2013, the disclosures of which are incorporated herein by reference.

FIELD OF THE INVENTION

The present invention relates to a metal nanoplate, a method for preparing the same, a conductive ink composition comprising the same, and a conductive film comprising the same.

BACKGROUND OF THE INVENTION

Various semiconductor devices, display devices such as PDP or LCD, or solar cells and the like include various elements having conductivity such as an electrode, wiring, or an electromagnetic shielding film. One of the most commonly used methods of forming such conductive elements comprises printing microparticles having conductivity, for example, a conductive ink composition comprising conductive nanoparticles and a solvent, on a substrate, and then, heat treating (for example, firing and drying) the same to form various conductive patterns or conductive membranes making up various conductive elements on a substrate.

However, in order to form the conductive membranes or the conductive patterns by using so far developed conductive nanoparticles, a process wherein a conductive ink composition comprising the same is printed on a substrate, and then, fired at high temperature to remove an organic substance (for example, an organic solvent) included in the conductive ink composition and reduce or melt-connect the conductive nanoparticles is required. This is to reduce the conductive nanoparticles included in the conductive ink composition or melt-connect the conductive nanoparticles so as to form a uniform conductive pattern or conductive membrane with excellent conductivity.

However, due to the requirement of the high temperature firing process, there has been a limitation in the kinds of a substrate on which a conductive membrane or conductive pattern may be formed. Accordingly, there has been a continuous demand for a conductive ink composition or conductive nanoparticle that may form a conductive pattern, etc. with excellent conductivity even if a lower temperature firing process or other heat treatment process is applied.

Therefore, various conductive ink compositions or conductive nanoparticles for low temperature firing have been suggested, however, there is a limitation in that firing temperature may not be sufficiently lowered or sufficient conductivity may not be obtained, and it is needed to develop new conductive nanoparticles or a conductive ink composition.

SUMMARY OF THE INVENTION

Technical Objectives

The present invention provides a metal nanoplate which can form a conductive pattern or a conductive membrane showing excellent conductivity even under the circumstances requiring low temperature firing.

The present invention also provides a method for preparing the metal nanoplate which can prepare the metal nanoplate with more simplified method than prior processes.

The present invention also provides a conductive ink composition which comprising said metal nanoplate, and can form a conductive pattern or a conductive membrane showing excellent conductivity even when heat treating or drying process of low temperature is applied thereto after it is printed on a substrate.

The present invention also provides a conductive film comprising said metal nanoplate.

Technical Solutions

The present invention provides a metal nanoplate that comprises a metal connected by the medium of a conductive polymer and has the thickness of 0.5 nm to 100 nm, the diameter of 200 nm or more, and the width larger than the thickness and equal to or less than the diameter, wherein the ratio of width/diameter is about 0.6 to about 1.

The present invention also provides a method for preparing the metal nanoplate comprising the step of reacting a conductive polymer and a metal salt.

The present invention also provides a conductive ink composition comprising the metal nanoplate and the second solvent.

The present invention also provides a conductive film comprising the metal nanoplate.

Advantageous Effect of the Invention

According to the present invention, it is possible to prepare a metal nanoplate which can form various conductive patterns or conductive membranes having excellent conductivity without high temperature firing process, a method for preparing the metal nanoplate, a conductive ink composition comprising the metal nanoplate, and a conductive film. Furthermore, a metal nanoplate having various applicabilities which can provide a catalyst having excellent activity with low noble metal content and a preparation method thereof may be provided.

In the case of using the metal nanoplate of the present invention and the conductive ink composition comprising the same, the conductive patterns or conductive membranes of various devices, display devices, solar cells, and so on can be desirably prepared especially under the circumstances requiring low temperature firing, and the technical limit such as the limitations on applicable substrates.

DETAILED DESCRIPTION OF THE INVENTION

Figure 1:
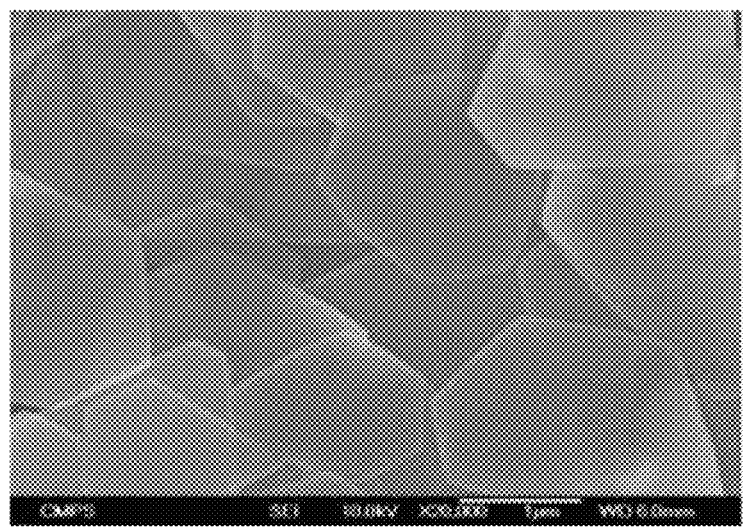
FIG. 1 is the SEM image of the metal nanoplate obtained in Example 1.

The metal nanoplate of the present invention comprises a metal connected by the medium of a conductive polymer and has a shape of which the thickness is 0.5 nm to 100 nm, the diameter is 200nm or more, the width is larger than the thickness and equal to or less than the diameter, and the ratio of width/diameter is about 0.6 to about 1.

And, the method for preparing the metal nanoplate of the present invention comprises the step of reacting a conductive polymer and a metal salt.

And, the conductive ink composition of the present invention comprises the metal nanoplate and the second solvent.

And, the conductive film comprises the metal nanoplate.

In the present invention, the terms "the first", "the second", and the like are used for explaining various components and said terms are only used for distinguishing one component from the other components.

Furthermore, the terms used in this description are just for explaining exemplary examples and it is not intended to restrict the present invention. The singular expression may comprise the plural expression unless it is clearly differently expressed contextually. It must be understood that the terms such as "comprises", "contains", and "has" in the present description are only used for designating the existence of characteristics taken effect, numbers, steps, components, or combinations thereof, and do not exclude the existence or the possibility of addition of one or more different characteristics, numbers, steps, components of combinations thereof beforehand.

The present invention can be variously modified and have various forms, and thus, specific examples of the present invention are explained in this description. However, it is not intended to limit the present invention to the specific examples and it must be understood that the present invention comprises every modifications, equivalents, or replacements comprised in the idea and technical scope of the present invention.

Unless otherwise described, some terms used throughout the specification are defined as follows.

In the present whole description, "metal nanoplate" refers to a nanostructure that comprises a metal and, in the 3-dimensional view, has the plate shape having a wide area in a plane direction and the thickness less than the same.

The longest straight-line distance between arbitrary two points on the perimeter of the wide plane of the nanostructure of the plate shape may be defined as a "diameter".

And, in the direction perpendicular to the length direction, the longest straight-line distance between two points on the perimeter of the plate shape and may be defined as a "width".

And, the average straight-line distance in the direction perpendicular to the plane from one end of the metal nanoplate to the opposite end may be defined as a "thickness".

Since one or more of the diameter, the width, and the thickness (for example, the thickness) have the size of nanoscale and the diameter and the width are larger than the thickness, the nanoplate can show the thin plate shape of polygon, circle, or oval.

And, the description that the metal nanoplate "substantially does not comprise a metal oxide" may refer to the case that the "metal" included in the metal nanoplate exists in a non-oxidized state and thus the metal nanoplate does not comprise a metal oxide at all, or the case that only a small amount of the metal, for example, only the metal less than 1 wt %, or less than 0.1 wt %, based on the weight of the metal nanoplate are inevitably oxidized during the preparation or use, and thus, the metal nanoplate comprises only a small amount of metal oxides corresponding thereto.

And, the description that the metal nanoplate comprise a single metal, for example, "only silver (Ag)", may refer to the case that the metal nanoplate comprises only one kind of metal, for example, a single metal component of "silver (Ag)" and does not comprise other kinds of metal components. However, when the description is not restricted to "only silver (Ag)" but expressed as just "silver (Ag)", it may refer to that it does not exclude the addition of other metal components to the metal nanoplate.

And, the term "a conductive ink composition" refers to a composition that may be printed or coated on a substrate formed of a polymer, glass or metal, etc. to form a film or a pattern, irrespectively of whether it is a "paste" with relatively high viscosity or has low viscosity like water.

And, the term "a conductive film" refers to an arbitrary membrane, film or pattern that is formed on a substrate made of a polymer, glass or metal, etc. to have thermal or electrical conductivity.

Hereinafter, the metal nanoplate of the present invention, the preparation method thereof, and the conductive ink composition and the conductive film comprising the same are explained in more detail.

The metal nanoplate according to one aspect of the present invention comprises a metal connected by the medium of a conductive polymer, and has a plate shape of which the thickness is 0.5 nm to 100 nm, the diameter is 200 nm or more, the width is larger than the thickness and equal to or less than the diameter, and the ratio of width/diameter is about 0.6 to about 1.

According to one embodiment of the present invention, the metal nanoplate may have the thickness of about 0.5 nm to about 100 nm, and preferably about 0.5 nm to about 50 nm.

Furthermore, the metal nanoplate may have the diameter of about 200 nm to about 100 μm, preferably about 200 nm to about 50 μm, and more preferably about 200 nm to about 20 μm.

Furthermore, the metal nanoplate may have a ratio of diameter/thickness of about 2 or more, preferably about 10 to about 20,000, and more preferably about 100 to about 2,000.

Furthermore, the metal nanoplate may have the width of about 120 nm to about 100 μm, preferably about 120 nm to about 50 μm, and more preferably about 200 nm to about 20 μm.

According to the research results of the present inventors, it is revealed that a nanostructure, namely, a metal nanoplate, having planes of somewhat wide area in addition to the thickness of nanoscale suitable for a conductive nanostructure, specifically having the thickness of 0.5 nm to 100 nm, the diameter of 200 nm or more, and the width larger than the thickness and equal to or less than the diameter, wherein the ratio of width/diameter is about 0.6 to about 1 can be obtained by the method for reacting a conductive polymer and a metal salt together under a certain reaction condition. Such metal nanoplate is prepared to have the planes of wide area than prior known conductive nanostructures or conductive particles, and since one or more of the diameter, the width, and the thickness (for example, the thickness) have the size of nanoscale and the diameter or the width is larger than the thickness, the nanoplate can have a thin plate shape of polygon, circle, or oval. Furthermore, the metal nanoplate, it will be mentioned again more in detail later, can be prepared by the method comprising above simple reaction under relatively low pressure and temperature and thus it may not comprise a metal oxide substantially, and for example it may be formed so as to comprise a single metal component such as silver (Ag).

The metal nanoplate according to one embodiment of the present invention having said diameter and the width larger than the thickness and equal to or less than the diameter and the ratio of width/diameter is about 0.6 to about 1 can be obtained in the plate shape in which minute metal particles having the thickness of at least nanoscale are connected so as to provide sufficiently wide surface area, and substantially may not comprise the metal oxide. Therefore, when the conductive ink composition comprising such metal nanoplate is printed on a substrate, the conductive film formed therefrom, for example, the conductive membrane or the conductive pattern, can show sufficiently excellent conductivity even though a separate high temperature firing process which has been applied thereto for reducing or melt-connecting the conductive nanoparticles is not applied. And, the metal nanoplate may be formed so that only a single metal component, for example, such as silver (Ag), is comprised. Therefore, since the metal nanoplate is formed so as to comprise only a single metal component showing a lower resistance, such as silver (Ag), it is possible to make the conductive film formed therefrom show more excellent conductivity.

Therefore, the metal nanoplate can be very preferably used for the conductive ink composition for preparing the conductive patterns or conductive membranes of various semiconductor devices, display devices, solar cells, and so on especially under the circumstances requiring low temperature firing.

Meanwhile, since the metal nanoplate is formed by the reaction of the conductive polymer and the metal salt, minute metal particles can be connected by the medium of the conductive polymer and form the plate shape having the planes of wide area. Such metal nanoplate may comprise the conductive polymer that connects the metal particles mutually and makes the plate shape be maintained desirably. Since the metal nanoplate comprises such conductive polymer and can be prepared without high temperature firing, the metal nanoplate can form the plate shape having the planes of wide area without comprising metal oxides substantially. Therefore, as disclosed above, when the conductive ink composition comprising such metal nanoplate is used for printing, the conductive film formed therefrom, for example, the conductive membrane or the conductive pattern, can show uniform and excellent conductivity without a separate high temperature firing process which has been applied thereto for reducing or melt-connecting the conductive nanoparticles.

According to one embodiment of the present invention, the metal nanoplate substantially may not comprise metal oxides. Namely, only the metals less than 1 wt %, or less than 0.1 wt %, based on the weight of the metal nanoplate may be oxidized, and thus, the metal nanoplate may comprise only a small amount of metal oxides corresponding thereto. As explained below, since the metal nanoplate can be prepared by the reaction of the conductive polymer and the metal salt under lower temperature and normal pressure, for example, at −40° C. and 1 atm, in comparison to the preparation condition of prior metal nanostructures, the oxidation of the metal caused by the high temperature reaction process for preparing prior conductive nanoparticles is minimized and it substantially may not comprise the metal oxides. Accordingly, the conductive film prepared therefrom can show excellent conductivity without a separate high temperature firing process that has been applied after printing the conductive ink composition for reducing the conductive nanoparticles comprised therein.

Furthermore, according to one embodiment of the present invention, the metal nanoplate may comprise an arbitrary conductive metal, noble metal, or alloy having excellent conductivity, for example, one or more metals selected from the group consisting of silver (Ag), gold (Au), platinum (Pt), palladium (Pd), iridium (Ir), ruthenium (Ru), rhodium (Rh), copper (Cu), and nickel (Ni), or an alloy thereof. Due to this, various conductive patterns or conductive membranes prepared from the metal nanoplate and the conductive ink composition comprising the same can exhibit more excellent conductivity and the metal nanoplate can be properly used as a catalyst. Accordingly, the metal nanoplate can be applied to various fields such as the conductive ink composition for preparing the conductive film or the catalyst by regulating the metal components composing the same variously.

Particularly, the metal nanoplate may be the plate shape comprising the conductive polymer, and thus, it can comprise only a single metal component, for example, only one or more metals selected from the group consisting of silver (Ag), gold (Au), platinum (Pt), palladium (Pd), iridium (Ir), ruthenium (Ru), rhodium (Rh), copper (Cu), and nickel (Ni). Namely, since the conductive polymer takes a role of connecting the metal component for forming the metal nanoplate of the plate shape, there is no need for comprising 2 or more kinds of metal components so that one or more of them form a frame of the plate shape or a basic mold and the metal nanoplate may comprise only a single metal component. Therefore, the metal nanoplate composed of only the metal component suitable to each application field can be easily obtained, and such metal nanoplate can be more desirably applied to various fields such as the conductive films or the catalysts. For example, the metal nanoplate may comprise only a single metal component such as silver (Ag) as the metal component, and in this case, the metal nanoplate and the conductive film prepared therefrom may exhibit more excellent conductivity because the metal component such as silver (Ag) shows low electric resistance.

The above explained metal nanoplate makes it possible to prepare various conductive films such as conductive patterns or conductive membranes showing excellent conductivity even though high temperature firing process is not applied thereto after printing the conductive ink composition comprising the same on an arbitrary matter or substrate formed of a polymer, a glass, or a metal. Particularly, the metal nanoplate and the conductive ink composition comprising the same do not require the high temperature firing process and may be applied on a substrate formed of any material to form various conductive patterns or conductive films. Therefore, the metal nanoplate may be very preferably applied for an ink composition for forming various conductive films included in various display devices such as PDP or LCD, semiconductor devices or solar cells, for example, various conductive membranes or conductive patterns such as various electrodes, wirings or an electromagnetic shielding film. For example, the metal nanoplate may be printed on a transparent substrate and applied for forming a transparent conductive film such as a transparent conductive membrane included in a touch panel, applied for forming various wiring patterns or electrodes of a semiconductor substrate, or applied for forming various wiring patterns, electrodes or an electromagnetic shielding filter of various display devices. And, since the metal nanoplate may exhibit excellent conductivity for various heats, it may be also applied for forming various thermal conductive films. Particularly, the metal nanoplate may be more preferably applied under an environment requiring a low temperature firing.

Meanwhile, the preparation method for the metal nanoplate according to one aspect of the present invention comprises the step of reacting the conductive polymer and the metal salt. It is revealed that the minute metal particles can be connected in the plate shape having the planes of wide area by the medium of the conductive polymer and the metal nanoplate having the above characteristics can be prepared even though the reaction is carried out at relatively low temperature and pressure through such reaction process. Particularly, since such reaction process does not require the reaction condition of high temperature and high pressure and the reactants react in a single step, the metal nanoplate is very easily and simply prepared, and the prepared metal nanoplate substantially may not comprise metal oxides because the oxidation of metal caused by the high temperature and high pressure reaction is inhibited.

According to one embodiment of the present invention, the preparation method for the metal nanoplate may comprise the steps of forming a dispersion solution comprising the conductive polymer, and reacting the conductive polymer and the metal salt by putting the metal salt in the dispersion solution. The reaction step may be effectively carried out even at low temperature and normal pressure, and particularly at low temperature environment, for example, at about −40° C. to about 30° C., preferably about −40° C. to about 15° C., and about 0.5 to 2 atm for about 10 mins to about 250 hrs, and the metal nanoplate according to one embodiment of the present invention having the above characteristics can be effectively prepared by this.

According to one embodiment of the present invention, any known arbitrary conductive polymers, for example, polypyrrole, polyaniline, polythiophene, or a copolymer thereof may be used as the conductive polymer in such preparation method without particular limitation.

Furthermore, an arbitrary salt of metals having conductivity may be used as the metal salt, and common metal salts which have been used before as precursors for forming the conductive nanoparticles may be used without particular limitation. For example, one or more metal salts selected from the group consisting of silver (Ag), gold (Au), platinum (Pt), palladium (Pd), iridium (Ir), ruthenium (Ru), rhodium (Rh), copper (Cu), and nickel (Ni) may be used, and a nitrate, a sulfate, an acetate, a halide, a carbonate, a lactate, a cyanide, a cyanate, a sulfonate, and so on of the metal or the noble metal may be used.

More specifically, for example, in order to prepare the metal nanoplate comprising silver (Ag) having excellent conductivity as the metal component, a salt of silver (Ag) may be used as the metal salt, and silver nitrate ($AgNO_3$), silver sulfate ($Ag_2SO_4$), silver acetate ($Ag(CH_3COO)$), silver halide such as silver fluoride (AgF), silver chloride (AgCl), silver bromide (AgBr) or silver iodide (AgI), silver cyanide (AgCN), silver cyanate (AgOCN), silver lactate ($Ag(CH_3CHOHCOO)$), silver carbonate ($Ag_2CO_3$), silver perchlorate ($AgClO_4$), silver acetate trifluoride (Ag($CF_3COO$)) or silver trifluoride methyl sulfonate (Ag($CF_3SO_3$)), and the like may be used but it is not limited to or by this, and any other common salts of metals which have been used as precursors for forming the conductive nanoparticles in the present technical field may be used without particular limitation.

And, it is sure that any conductive polymers or various salts of conductive metals may be used in addition to the above illustrated conductive polymers or metal salts.

And, although only the metal salt and the conductive polymer may be reacted for preparing the metal nanoplate, when the reduction potential of the metal component of the metal salt, namely, the metal component to be included in the metal nanoplate, is relatively low, the metal component may be more effectively reduced on the conductive polymer from the metal salt and the reaction may become faster and the yield may increase by progressing the reaction of the metal salt and the conductive polymer in the presence of a reducing agent. Thereby, the metal nanoplate may be easily obtained with high yield.

At this time, the kinds of usable reducing agents may be varied according to the kinds of metal components of the metal salts, and those having lower standard reduction potential than the metal salt or corresponding metal ion may be selected and used so as to reduce corresponding metal salt. As the reducing agent, those commonly known according to the kinds of each metal component may be used without specific limitations, and for example, a multivalent phenol-based compound such as hydrazine, ascorbic acid, hydroquinone, resorcinol or cathecol; an amine-based compound such as triethylamine; a pyridine-based compound such as dimethylaminopyridine; a aldehyde based compound such as formaldehyde; a multivalent alcohol-based compound such as ethylene glycol, or a mixture thereof may be used.

According to one embodiment of the present invention, the reaction of the metal salt and the conductive polymer may be carried out in a solvent (hereinafter, 'the first solvent') selected from the group consisting of water, alcohol, acetone, methyl ethyl ketone (MEK), ethylene glycol, $HCONH_2$, dimethylformamide (DMF), dimethylacetamide (DMAc), dimethyl sulfoxide (DMSO), N-methylpyrrolidone (NMP), and a mixed solvent thereof.

For example, the reaction of the conductive polymer and the metal salt may be carried out by the method for dispersing the conductive polymer in an alcohol for forming a dispersion solution and carrying out the reaction with adding the metal salt to the dispersion solution, and when a water-soluble conductive polymer such as polyaniline is used, the conductive polymer may be dispersed in water and the reaction may be carried out with adding the metal salt thereto.

At this time, the metal salt may be added as a solid, or it may be made into a solution and then added. If the obtained mixed dispersion is maintained at the above described temperature and pressure condition for a predetermined time, the metal nanoplate is formed in the dispersion. In the reaction process, the addition order of each reactant or forming method and mixing order of the dispersion, and the like may be obviously modified by a person skilled in the related art.

The metal nanoplate prepared by the above method may be mixed with a solvent to provide a printable conductive ink composition or provide a catalyst of various reactions, etc.

Meanwhile, the conductive ink composition according to the other aspect of the present invention comprises the metal nanoplate comprising a metal connected by the medium of a conductive polymer and having the thickness of about 0.5 nm to about 100 nm, the diameter of about 200 nm or more, and the width larger than the thickness and equal to or less than the diameter, wherein the ratio of width/diameter is about 0.6 to about 1, and the second solvent.

The details of the metal nanoplate comprised in the conductive ink composition are the same as above. Namely, the metal nanoplate may be composed of low resistance single metal component such as silver (Ag) while substantially not comprising a metal oxide, and it may be a plate shape in which minute metal particles having the size (thickness) of nanoscale form the planes of wide area.

According to one embodiment of the present invention, any arbitrary solvents comprised in prior conductive ink composition may be used as the second solvent without particular limitation, and for example, one or more solvents selected from the group consisting of an alcohol-based solvent such as ethanol, an alcoholalkylether-based solvent, an alcoholarylether-based solvent, an ester-based solvent, an amide-based solvent, an amine-based solvent, an aliphatic hydrocarbon-based solvent, and an aromatic hydrocarbon-based solvent may be used, but it is not limited to or by this.

Therefore, if the ink composition is printed on a substrate, a conductive film such as various conductive membranes or conductive patterns exhibiting excellent conductivity may be formed without applying a high temperature firing process that has been progressed for reducing or melt-connecting conductive nanoparticles.

Namely, if the conductive ink composition is printed or coated on a substrate and then simply dried (or heat treated) at low temperature to remove the solvent, the conductive film such as various conductive membranes or conductive patterns comprising a plurality of nanoplates that do not substantially comprise a metal oxide and are formed into a plate shape in which metal membranes of nanoscale thickness form the planes of wide area may be formed, and thus, the conductive membrane or conductive pattern may exhibit very excellent conductivity.

Therefore, the conductive ink composition may be preferably applied for forming various conductive films such as various conductive membranes or conductive patterns of electrodes, wirings or an electromagnetic shielding film included in a display device such as PDP or LCD, a semiconductor device or a solar cell, or a thermal conductive film. For example, the conductive ink composition may be printed on a transparent substrate and applied for forming a transparent conductive membrane included in a touch panel, applied for forming various wiring patterns or electrode of a semiconductor substrate, or applied for forming various wiring patterns, electrodes or an electromagnetic shielding filter of various display devices. Particularly, the conductive ink composition may be more preferably applied under an environment requiring low temperature firing, and since it does not require high temperature firing, it may overcome a limitation of the kinds of applicable substrates.

And, the metal nanoplate may be provided as a catalyst of various reactions, and it may comprise a suitable noble metal component according to the reaction. Since such catalyst comprises a metal nanoplate containing a noble metal ingredient instead of common noble metal microparticles (noble metal nanoparticles), a contact area of the noble metal ingredient having a catalytic activity and a reactant may be comparatively increased. Thus, it may exhibit comparatively excellent activity even with a low content of the noble metal component.

Meanwhile, the conductive ink composition or the catalyst comprising the above nanoplate may have a component of a conductive ink composition or a noble metal catalyst which is commonly known in the present technical filed, except that it comprises the metal nanoplate instead of common metal nanoparticles or a metal nanostructure of a different shape. For example, the conductive ink composition may further comprise arbitrary components which have been comprised in common conductive ink composition with necessity, for example, a dispersant, a binder, and a pigment, in addition to the metal nanoplate and the second solvent.

Furthermore, the conductive ink composition may comprise about 0.01 wt % to about 95 wt % of the metal nanoplate based on the total weight of the composition. By this, the dispersibility of the metal nanoplate in the conductive ink composition becomes good, and it becomes possible to prepare the conductive membrane or the conductive pattern later by eliminating the solvents easily.

Meanwhile, the conductive film according to still another aspect of the present invention comprises the metal nanoplate. The conductive film, for example, may be the conductive membrane or the conductive pattern. Such conductive film shows excellent conductivity but does not require high temperature firing process in the preparing process of the same, and thus, it may overcome technical limitations such as a limitation of the kinds of applicable substrates and can be applied for various substrates and electric or electronic devices.

Such conductive film, for example, may be formed by the method for printing or coating the above conductive ink composition on a substrate, and eliminating the solvent and so on comprised in the conductive ink composition by drying or heat-treating at low temperature, for example, at about 50° C. to about 200° C.

The metal nanoplates, for example, silver (Ag) nanoplates, may be connected together to form a conductive channel in the conductive film prepared like above. In such conductive channel, there is a probability of contact between wide faces, between narrow faces, between edges, or between vertices of the metal nanoplates at the contact point where the metal nanoplates meet each other. However, considering the shear force provided during coating the conductive film in company with the wide work plane area of the metal nanoplates disclosed above, it is highly probable that the metal nanoplates are distributed in the conductive film in the form of that their wide faces lie on the bottom and a probability of contact between the wide faces gets higher. When the conductive film is formed from the ink composition comprising other forms of nanostructure such as prior nanowire and so on, a probability of that the contact point of the nanostructures is formed by narrow lines or points gets higher and the resistance of the conductive channel increases and the conductivity decreases relatively. However, the conductive film according to the other embodiment of the present invention has a high probability of that the contact point of the metal nanoplates is formed by wide faces, and thus, it is predictable that the film has superior conductivity to prior known films.

Therefore, the conductive film may be formed into an arbitrary conductive membranes or conductive pattern of electrodes, wirings or an electromagnetic shielding film comprised in various display devices, semiconductor devices or solar cells, and it may be a transparent conductive film such as a transparent conductive membrane that is formed on a transparent substrate and comprised in a touch panel.

Particularly, when the touch panels, the solar cells, the display devices, or the semiconductor devices to which such conductive film is applied comprise the conductive component that is formed without high temperature firing process and shows excellent conductivity, technical limitations such as a limitation of the kinds of applicable substrates decrease and it becomes possible to exhibit excellent characteristics.

Meanwhile, such touch panels, solar cells, display devices, or semiconductor devices may be prepared according to common process, except that the conductive film prepared from said conductive ink composition is comprised therein.

Hereinafter, the present invention will be explained in detail by the following Examples. However, these Examples are only to illustrate the invention, and the scope of the invention is not limited thereto.

DETAILED DESCRIPTION OF THE EMBODIMENTS

Preparation of a Reagent

Reagents used for preparation of the silver nanoplate as after-mentioned were as follows, and they were used as purchased without specific purification.

Aniline hydrochloride (Aldrich, 97%), 2-aminobenzoic acid (Aldrich, 99%), 1,3-phenylenediamine (Aldrich, 99+%), 1,3-propane sultone(Aldrich, 98%), ammonium persulfate (Acros, 98%), $K_2PtCl_4$ (Aldrich), $Pd(NO_3)_2 \cdot H_2O$ (Aldrich, ~40% Pd basis), $AuCl_3$ (Aldrich, 99%), HCl (Duksan), $HNO_3$ (Duksan), $AgNO_3$ (Acros, Wako, 99%), ethylene glycol (Aldrich, 99.8%)

SYNTHESIS OF A CONDUTIVE POLYMER

Synthesis Example 1

Synthesis of N-(1',3'-Phenylenediamino)-3-Propane Sulfonate

In a 1 L flask, 54.07 g (0.500 mol) of m-phenylenediamine and 61.07 g (0.500 mol) of 1,3-propane sultone were dissolved in 500 ml of THF, and the mixture was refluxed and agitated for 24 hours. It was cooled to room temperature and filtered with a glass filter, and then, washed with 1000 ml of a THF:n-Hex 1:1 (v/v) mixed solvent and vacuum dried to obtain 108.52 g of gray-blue powder (0.472 mol, 94.3% yield). The obtained N-(1',3'-phenylenediamino)-3-propane sulfonate has the chemical structure of the reaction product of the following Reaction Formula a.

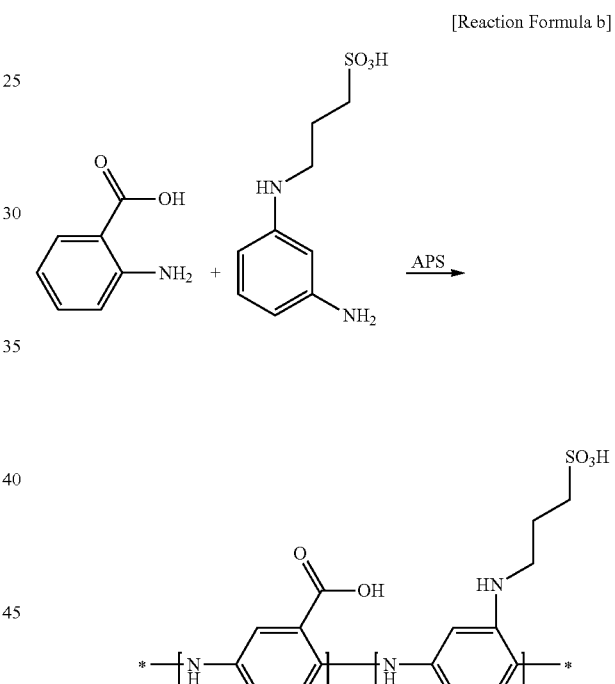

N-(1',3'-phenylenediamino)-3-propane sulfonate

Synthesis Example 2

Synthesis of P[anthranilic acid]$_{0.5}$-[N-(1',3'-phenylenediamino)-3-Propane Sulfonate]$_{0.5}$ 3.43 g of anthranilic acid and 5.75 g of N-(1',3'-phenylenediamino)-3-propane sulfonate obtained in Synthesis Example 1 were dissolved in a mixed solution of 300 ml of a HCl solution and 100 ml of EtOH, and 200 ml of 0.2 M HCl solution in which 14.21 g of ammonium persulfate is dissolved was added thereto over 10 minutes, and then, the mixture was agitated for 24 hours. 3.6 L of acetone was added to the solution to obtain a polyaniline polymer precipitate, which was centrifuged at 4000 rpm for 1 hour to separate the precipitate. And then, it was washed with a mixed solution of acetone/0.2 M HCl (6:1 v/v) 3 times and dried to obtain 6.12 g of P[anthranilic acid]$_{0.5}$-[N-(1',3'-phenylenediamino)-3-propane sulfonate]$_{0.5}$ (66.4% yield). The compositional ratio of two repeat units of the obtained polyaniline was confirmed as 52:48 (analyzed by solid state NMR), and the weight average molecular weight was confirmed as about 2830 (analyzed by GPC). And, it was confirmed that the conductive polymer of P[anthranilic acid]$_{0.5}$-[N-(1',3'-phenylenediamino)-3-propane sulfonate]$_{0.5}$ has the chemical structure of the reaction product of the following Reaction Formula b.

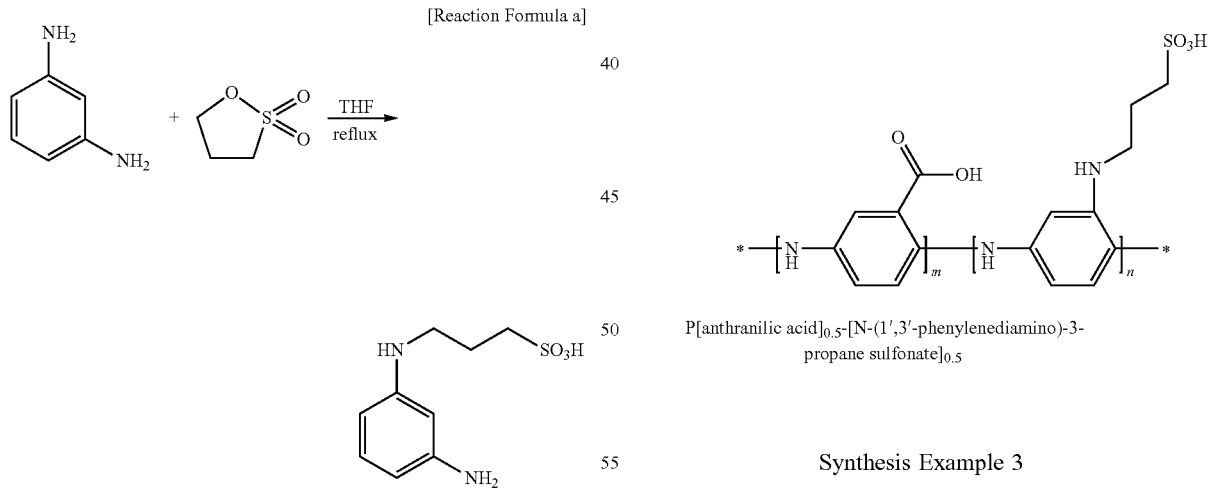

P[anthranilic acid]$_{0.5}$-[N-(1',3'-phenylenediamino)-3-propane sulfonate]$_{0.5}$ Synthesis Example 3

Synthesis of P[ANi]$_{0.5}$-[N-(1',3'-phenylenediamino)-3-propane sulfonate]$_{0.5}$ 4.72 g of P[ANi]$_{0.5}$-[N-(1',3'-phenylenediamino)-3-propane sulfonate]$_{0.5}$ was obtained by the same method as Synthesis Example 2, except that 3.24 g of aniline hydrochloride was used instead of 3.43 g of anthranilic acid. P[ANi]$_{0.5}$-[N-(1',3'-phenylenediamino)-3-propane sulfonate]$_{0.5}$ obtained like this is represented by the repeating unit structure of the following Chemical Formula a.

[Chemical Formula a]

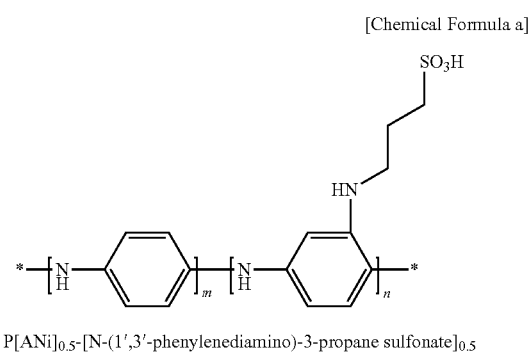

P[ANi]$_{0.5}$-[N-(1',3'-phenylenediamino)-3-propane sulfonate]$_{0.5}$

PREPARATION OF METAL NANOPLATE

Example 1

100 mg of the conductive polymer P[anthranilic acid]$_{0.5}$-[N-(1',3'-phenylenediamino)-3-propane sulfonate]$_{0.5}$ prepared in Synthesis Example 2 and 167 mg of AgNO$_3$ were dispersed in 50 ml of distilled water and left alone at 4° C. for 168 hrs. The precipitated lump of the metal nanopltes was filtered with a paper filter, washed with 50 ml of distilled water, and dried well so as to obtain the refined metal nanoplate.

Example 2

100 mg of the conductive polymer P[anthranilic acid]$_{0.5}$-[N-(1',3'-phenylenediamino)-3-propane sulfonate]$_{0.5}$ prepared in Synthesis Example 2 and 167 mg of AgNO$_3$ were dispersed in the mixed solution of 25 ml of distilled water and 25 ml of ethylene glycol and left alone at −25° C. for 168 hrs. The precipitated lump of the metal nanopltes was filtered with a paper filter, washed with 50 ml of distilled water, and dried well so as to obtain the refined metal nanoplate.

Example 3

100 mg of the conductive polymer P[ANi]$_{0.5}$-[N-(1',3'-phenylenediamino)-3-propane sulfonatel]$_{0.5}$ prepared in Synthesis Example 3 167 mg of AgNO$_3$ were dispersed in 50 ml of distilled water and left alone at 4° C. for 168 hrs. The precipitated lump of the metal nanopltes was filtered with a paper filter, washed with 50 ml of distilled water, and dried well so as to obtain the refined metal nanoplate.

Figure 2:
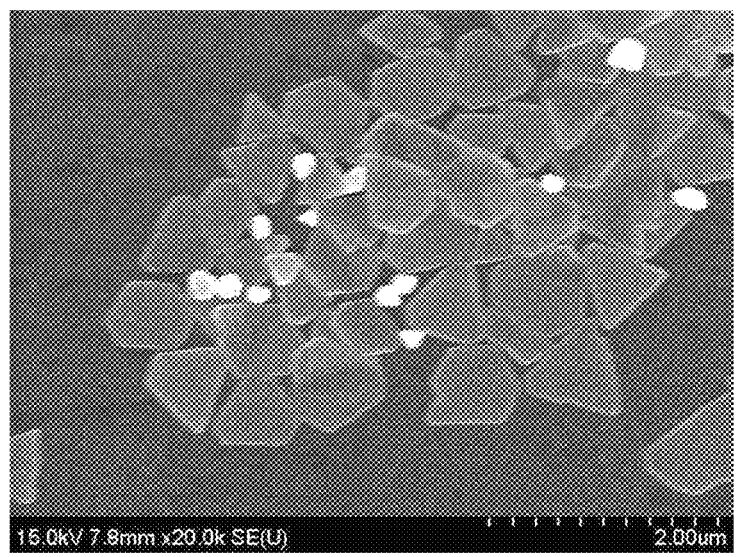
FIG. 2 is the SEM image of the metal nanoplate obtained in Example 2.
Figure 3:
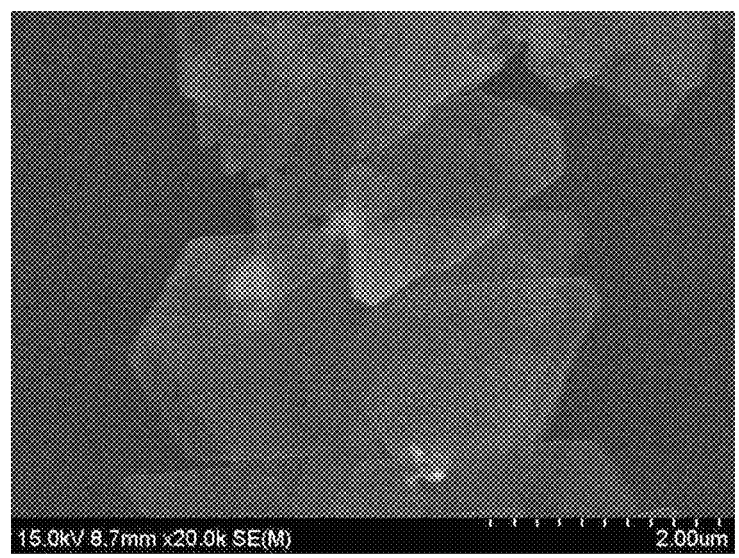
FIG. 3 is the SEM image of the metal nanoplate obtained in Example 3.

FIGS. 1 to 3 are the SEM photos of the silver nanoplates obtained in Examples 1 to 3. The size of the silver nanoplates obtained like this was measured by using the SEM photos, and it is recognized that the nanoplates show the plate shape having the thickness of about 10 nm to about 20 nm and the diameter or the width of about 1 μm to about 2 μm on average.

The invention claimed is:

1. A metal nanoplate comprising a metal connected by a medium of a conductive polymer and having a thickness of 0.5 nm to 100 nm, a diameter of 200 nm or more, and a width larger than the thickness and equal to or less than the diameter, wherein a ratio of width/diameter is 0.6 to 1, wherein a ratio of diameter/thickness is 100 to 2000, and wherein the conductive polymer comprises polyaniline, polypyrrole, or a copolymer thereof.

2. The metal nanoplate of claim 1, wherein the diameter is 200 nm to 100 μm.

3. The metal nanoplate of claim 1, wherein the width is 120 nm to 100 μm.

4. The metal nanoplate of claim 1, wherein the metal nanoplate has a plate shape of polygon, circle, or oval.

5. The metal nanoplate of claim 1, wherein the metal nanoplate comprises a metal oxide less than 1 wt %.

6. The metal nanoplate of claim 1, wherein the metal comprises one or more metals selected from the group consisting of silver (Ag), gold (Au), platinum (Pt), palladium (Pd), iridium (Ir), ruthenium (Ru), rhodium (Rh), copper (Cu), and nickel (Ni).

7. The metal nanoplate of claim 1, wherein the metal is silver (Ag).

8. A method for preparing the metal nanoplate of claim 1, comprising reacting a conductive polymer and a metal salt.

9. The method of claim 8, wherein the reacting the conductive polymer and the metal salt is carried out at −40° C. to 30° C.

10. The method of claim 9, wherein the reacting the conductive polymer and the metal salt is carried out for 10 minutes to 250 hours.

11. The method of claim 8, wherein the method comprises
forming a dispersion solution comprising the conductive polymer; and
reacting the conductive polymer and the metal salt by putting the metal salt in the dispersion solution.

12. The method of claim 8, wherein the metal salt is one or more metal salts selected from the group consisting of silver (Ag), gold (Au), platinum (Pt), palladium (Pd), iridium (Ir), ruthenium (Ru), rhodium (Rh), copper (Cu), and nickel (Ni).

13. The method of claim 12, wherein the salt of silver is one or more salts selected from the group consisting of silver nitrate (AgNO$_3$), silver sulfate (Ag$_2$SO$_4$), silver acetate (Ag(CH$_3$COO)), silver fluoride (AgF), silver chloride (AgCl), silver bromide (AgBr), silver iodide (AgI), cyanide (AgCN), silver cyanate (AgOCN), silver lactate (Ag(CH$_3$CHOHCOO)), silver carbonate (Ag$_2$CO$_3$), silver perchlorate (AgClO$_4$), silver trifluoroacetate (Ag(CF$_3$COO)), and silver trifluorosulfonate (Ag(CF$_3$SO$_3$)).

14. The method of claim 8, wherein the reaction of the conductive polymer and the metal salt is carried out in a first solvent comprising one or more solvents selected from the group consisting of water, alcohol, acetone, methyl ethyl ketone (MEK), ethylene glycol, formamide HCONH$_2$, dimethylformamide (DMF), dimethyl acetamide (DMAc), dimethyl sulfoxide (DMSO), N-methyl pyrrolidone (NMP).

15. A conductive ink composition comprising the metal nanoplate according to claim 1, and a second solvent.

16. The conductive ink composition of claim 15, further comprising one or more components selected from the group consisting of a dispersant, a binder, and a pigment.

17. The conductive ink composition of claim 15, wherein the second solvent comprises one or more solvent selected from the group consisting of water, an alcohol-based solvent, an alcoholalkylether-based solvent, an alcoholaryle-ther-based solvent, an ester-based solvent, an amide-based solvent, an amine-based solvent, an aliphatic hydrocarbon-based solvent, and an aromatic hydrocarbon-based solvent.

18. A conductive film, comprising the metal nanoplate according to claim 1.

19. The conductive film of claim 18, wherein the conductive film is a conductive membrane or a conductive pattern of a display device, a semiconductor device, or a solar cell.

20. The conductive film of claim 19, wherein the conductive film is a transparent conductive film of a touch panel.

\* \* \* \* \*